Dec. 16, 1941.   H. SEEGERS ET AL   2,266,277
TEMPERATURE RESPONSIVE GAUGE
Filed May 1, 1939
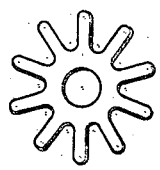
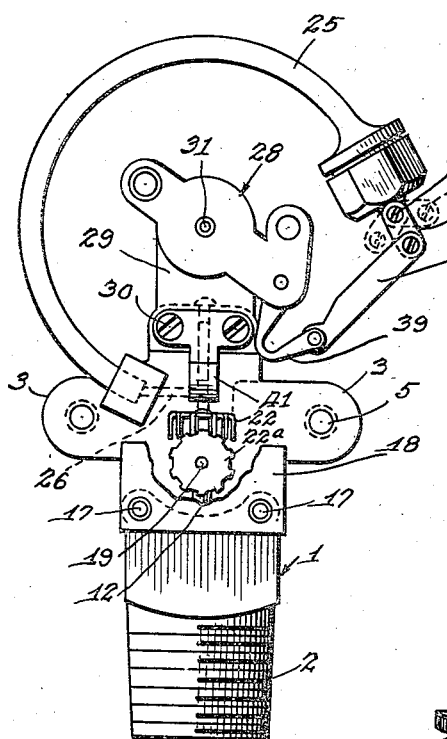

Patented Dec. 16, 1941

2,266,277

UNITED STATES PATENT OFFICE 2,266,277

TEMPERATURE RESPONSIVE GAUGE

Hans Seegers and Reynold T. Hedfield, Chicago, Ill., assignors to Jas. P. Marsh Corporation, Chicago, Ill., a corporation of Illinois Application May 1, 1939, Serial No. 270,988

5 Claims. (Cl. 73—367)

This invention relates to gauges and more particularly to a combined temperature and pressure-altitude gauge in which the temperature, altitude, and pressure may each visibly be indicated.

The gauge is preferably provided with a mechanism of the Bourdon tube type or other suitable pressure element for indicating pressure and altitude and a mechanism of the bimetallic temperature responsive type for indicating temperature. The latter may be entirely enclosed within the supporting nipple of the gauge and the former may be secured to and supported on the nipple, which is threaded or otherwise constructed in a manner to be inserted in or otherwise secured in operative relation to the usual complementary opening in a reservoir or tank.

This invention is an improvement over, or a modification of, our prior application Serial No. 239,906, filed November 12, 1938, and is particularly directed to a gauge structure of the type therein described in which the gauge is provided with a bottom connection and in which a special type of transmission is provided between the shaft of the bimetallic element and the temperature pointer or indicator, which transmission enables contraction and expansion of said element or longitudinal movement of said shaft while maintaining at all times accurate registration of the pointer. The said prior application covers a back connection type gauge and the present application particularly relates to a bottom connection type of gauge, and the said prior application may be referred to for a better understanding of our present invention.

A further object is to provide an inexpensive and rugged gauge wherein all operating mechanisms are directly supported by the bottom connection nipple itself, whereby they will not easily get out of order, and in which the complete assembly comprises a minimum number of parts arranged to easily be assembled.

Further objects will be apparent from the specification and the appended claims.

In the drawing:

Fig. 1 is a transverse vertical sectional view through the gauge and nipple with various elements shown in full lines for purposes of illustration.

Fig. 2 is a front elevation of the nipple and gauge mechanism shown in Fig. 1, with the casing, dial, and pointers removed and a portion of the bracket which forms a bearing for the temperature indicator shaft broken away to more clearly illustrate details of the transmission.

Fig. 3 is a perspective view of the transmission gears in normal assembled relation.

Fig. 4 is a side elevation of one of the crown gears.

Fig. 5 is a plan view of a blank from which a crown gear may be formed.

Referring to the drawing in detail, the embodiment illustrated comprises a nipple 1, on which all of the various mechanisms including the dial and casing may be mounted and by which they are supported when the gauge is in use. The nipple 1 is vertically positioned as shown with respect to the gauge casing and is preferably an elongated casting having a threaded portion 2 adapted for insertion in a complementary threaded opening in a boiler or tank, whereby the gauge may be vertically supported. The nipple 1 is provided with laterally extending flanges 3 (Fig. 2) and is adapted to extend through the bottom wall of the casing 4, as shown in Fig. 1, whereby the flanges 3 are adjacent the back of the casing and the casing may then be secured to the flanges 3 by means of suitable screws inserted into the threaded openings 5 in the flanges. The casing is thereby rigidly supported on the nipple in the position shown in Fig. 1. The front of the casing is open and is provided with a bezel 6 secured by means of screws or other suitable fastenings and arranged to retain a glass window 7, as shown.

The nipple 1 is provided with a longitudinal chamber 8 having a tubular extension or housing 9 inserted in the outer end thereof and soldered or brazed or otherwise sealed in the nipple. The housing 9 is closed at its outer end by means of a plug 10 sealed therein, whereby the nipple and extension form a rigid housing for a suitable temperature responsive mechanism. The upper end of the plug 10 is reduced in diameter and a helical bimetallic temperature responsive element 11 of a type well known in the art is secured to the reduced end of the plug by any suitable means. The opposite end of the bimetallic element 11 is secured to a longitudinal shaft 12 which is rotatably supported at its lower end in a bearing 13 in the plug 10 and, adjacent its upper end, is supported in a suitable bearing portion 14 of the nipple.

A dial 15 is supported on the nipple by means of screws 16 secured in the threaded openings 17 shown in Fig. 2. These screws also support a bracket 18, which forms the outer bearing of a horizontal indicator shaft 19, the inner end of this shaft 19 being provided with a suitable bearing at 20 in the body of the nipple. An indicator needle 21 is secured to the outer end of the shaft 19 by any suitable means so that it may be moved over a temperature indicating scale on the dial 15. The dial 15 and the scales and associated indicating needles of the present embodiment may be substantially identical with those illustrated in the previously mentioned copending application. It is, therefore, believed unnecessary to describe these elements in detail at this time.

In the disclosure of the said copending application, the horizontal nipple permitted the use of an indicator needle secured directly to the rotatable shaft of the temperature responsive element and the slight lateral movement of the needle, due to the expansion and contraction of the bimetallic element and consequent longitudinal movement of the shaft, was unimportant, as it did not interfere with accurate registration of the needle in accordance with temperature variations. However, in the vertical or bottom connection type of gauge of the instant disclosure, the indicator shaft 19 is at a right angle to the thermometer shaft 12. Therefore, if any ordinary type of transmission, such as bevel gears, is used between these shafts, lost motion or other objectionable features interfere with correct reading.

In the present embodiment and in order to provide a suitable positive transmission between the thermometer shaft and the needle, a special type and arrangement of crown gears 22 and 22a has been provided. The gear 22 is secured to the upper end of the vertical shaft 12 and the companion gear 22a is secured to the inner end of the indicator shaft 19 so that its inwardly extending teeth are in mesh with the downwardly extending elongated teeth of the gear 22. These gears are preferably formed of sheet metal, as shown in Figs. 3, 4, and 5, and are provided with laterally extending elongated teeth 23. The gears are preferably first blanked in a substantially star-shaped form such as shown in Fig. 5 and by dotted lines in Fig. 4. The elongated teeth are then formed at right angles to the body of the gear blank substantially on the dotted line shown in Fig. 5, whereby an arcuate portion 24 of the space between the teeth extends into the flat portion of the crown gear. This arcuate opening corresponds in width to the space between the teeth after they are formed laterally to the position shown in Fig. 4. The teeth are made with rounded ends, whereby, when the ends of the teeth on the indicator gear are meshed with the teeth of the crown gear on the vertical shaft 12, a very smoothly operating transmission is provided substantially without lost motion or backlash.

It will be apparent that, when the gears are meshed in the manner shown, the indicator needle 21 will be positively operated in accordance with the rotation of the vertical shaft 12 irrespective of any longitudinal movement of the vertical shaft due to expansion and contraction of the bimetallic element. As the space between the teeth is uniform and the teeth mesh accurately, the raising or lowering of the gear on the vertical shaft has no effect on the needle setting and the position of the needle is, therefore, only influenced by rotative movement.

A pressure responsive element preferably in the form of a Bourdon tube 25 is provided and the open end thereof is secured in the side of the nipple 1 in the usual manner, as illustrated particularly in Fig. 2. This open end of the Bourdon tube communicates through a horizontal restricted passage 26 with a vertical restricted passage 27 extending longitudinally of the nipple and terminating outside the housing 9 and, therefore, inside of the tank, on which the gauge may be mounted. By this means, pressure in the tank will be transmitted to the Bourdon tube in the most effective manner.

The closed end of the Bourdon tube is secured to a pressure indicating mechanism 28 and this mechanism is secured to an upwardly extending bracket 29, which is, in turn, mounted on the nipple 1 by means of screws 30. The indicating mechanism is provided with the usual forwardly extending rotatable shaft 31, which extends through the dial 15 and on which is mounted a needle or pointer 32 which moves over suitable graduations on the dial for indicating altitude and other graduations for indicating pressure.

An arm 33 is secured to the shaft 31 immediately behind the dial 15 and arranged to operate a maximum pressure registering pointer 34 which is mounted on a bearing on the dial and is coaxial with the shaft 31. This pointer or so-called telltale is frictionally retained on its bearing, whereby it will be retained in the maximum indicating position to which it is moved by the arm 33 during the operation of the device. The rear of the dial may be provided with pressure indicating graduations over which the telltale needle 33 passes when it is moved by the arm 33.

An auxiliary needle 35 may be frictionally mounted axially with the shaft 31 and arranged to manually be moved over the outside of the dial to any desired position on the altitude and pressure gauges. This needle is preferably of red or some contrasting color and is intended to be set manually to indicate any altitude or pressure which it is desired to approximately maintain. The various needles and their arrangements just described may be substantially identical with those shown in the previously mentioned copending application.

The free end of the Bourdon tube 25 is provided with a short outwardly extending arm 36. This arm is pivoted to the end of the Bourdon tube by means of a pivot screw 37, by which the arm may be located in fixed position with respect to the end of the tube 25. A lock washer 38 is provided between the arm 36 and the end of the Bourdon tube, so that the arm may rigidly be secured in any adjusted position. The arm 36 is connected to a pivoted arm 39, which forms an operating part of the needle mechanism 28, by means of a link 40. By loosening the screw 37, the arm 36 may be adjusted to any desired position to thereby adjust the pressure and altitude indicating needle 32 to any desired position relative to the scale with which it co-operates.

These gauges are sometimes subjected to very rough handling, particularly during shipment. A stop 41 is, therefore, provided which is preferably somewhat resilient and is in the form of a U-shaped arm having its free end positioned above the shaft 12 and gear 22 thereon so as to limit the upward movement thereof, whereby the gears 22 and 22a are always retained in mesh irrespective of any rough handling or shaking of the gauge. As shown in Fig. 1, end clearance is provided in the bearing 13 so that the shaft is free to float longitudinally in response to any longitudinal expansion or contraction of the element 14 which may take place throughout the normal indicator range.

Modifications may be made without departing from the spirit of the invention, and it is therefore desired that the invention be limited only by the prior art and the scope of the appended claims.

Having thus described this invention, what is claimed and desired to be secured by Letters Patent is:

1. In a temperature responsive gauge of the character described, the combination with an elongated nipple for attachment to an opening in a tank and having a thin walled tubular extension forming a housing extending into the tank and closed at its outer end, a longitudinal shaft having a bearing in the outer end of said housing and a bearing adjacent the outer end of said nipple and mounted for free rotary and longitudinal movement, and a helically wound bimetallic temperature responsive element having one end secured to the outer end of said housing and the other end secured to said shaft to rotate said shaft in response to temperature changes and enable said shaft to float longitudinally in accordance with variation in the length of said element, of a pointer rotatable in a plane parallel with the longitudinal axis of said shaft, a pair of crown gears rigidly secured respectively to said shaft and said pointer to cause positive movement of said pointer in accordance with rotary movement of said shaft and to enable simultaneous independent longitudinal movement of said shaft.

2. In a gauge, a housing, a supporting nipple extending from said housing and having a reduced extension forming a casing adapted to extend into a variable-temperature chamber, a longitudinal shaft extending through said nipple and into said housing and mounted for free rotary and longitudinal movement, a helically wound bimetallic thermally responsive element in said casing and having one end secured thereto and the opposite end secured to said shaft and arranged to rotate said shaft and move said shaft longitudinally in response to temperature changes, a gear axially secured to said shaft adjacent the end thereof in said housing, said gear having teeth parallel with said axis and materially longer from end to end than the longitudinal movement of said shaft under normal working temperature conditions, a crown gear having its axis substantially at a right angle to the axis of said shaft and meshing with said shaft gear in a manner to substantially prevent excessive lost motion therebetween irrespective of the longitudinal position of said shaft gear, and an indicator operated by said crown gear only in response to rotary movement of said shaft.

3. A temperature gauge comprising a nipple for mounting in a gauge housing to project vertically therefrom, said nipple comprising a body portion having a vertical shaft passage therethrough and including a thin-walled extension from the outer end of said body portion to form a housing for a temperature responsive element, a vertical shaft in said housing and nipple body and having a bearing adjacent the outer end of said housing and another bearing in the upper portion of said nipple, said shaft being mounted for free rotary movement and floating longitudinal movement in said bearings, a helically wound, temperature-responsive, expansible element in said housing and having one end secured to said shaft and the other end secured to said extension so as to rotate said shaft in response to variations in temperature and also enable free floating axial movement of said shaft in response to longitudinal expansion and contraction of said element, a horizontal shaft rotatably mounted on the upper end of said nipple and in the axial plane of said vertical shaft and having a crown gear rigidly secured thereon, a wide-face gear rigidly secured on said vertical shaft and in vertically sliding mesh with said crown gear, and an indicator on said horizontal shaft.

4. A claim according to claim 3 characterized by said wide face gear being positioned above said horizontal shaft and in mesh with the top of said crown gear.

5. A claim according to claim 3 characterized by said wide face gear being positioned above said horizontal shaft and in mesh with the top of said crown gear and a forwardly extending bracket on said body portion and extending over said vertical passage and forming bearings for both of said shafts.

HANS SEEGERS.
REYNOLD T. HEDFIELD.